United States Patent
Corbin, III et al.

(10) Patent No.: US 7,990,007 B2
(45) Date of Patent: *Aug. 2, 2011

(54) APPARATUS FOR TRANSFERRING TORQUE MAGNETICALLY

(75) Inventors: Philip Corbin, III, Tacoma, WA (US); Robert L. Dahlin, Bonney Lake, WA (US); John A. Molnar, Bellevue, WA (US); John B. Rusconi, Dublin, CA (US); Walter F. Strong, Sudburg, MA (US)

(73) Assignee: Flux Drive, Inc., Sumner, WA (US)

( * ) Notice: Subject to any disclaimer, the term of this patent is extended or adjusted under 35 U.S.C. 154(b) by 673 days.

This patent is subject to a terminal disclaimer.

(21) Appl. No.: 10/591,366

(22) PCT Filed: Feb. 26, 2005

(86) PCT No.: PCT/US2005/006179
§ 371 (c)(1),
(2), (4) Date: Jan. 16, 2007

(87) PCT Pub. No.: WO2005/086330
PCT Pub. Date: Sep. 15, 2005

(65) Prior Publication Data
US 2007/0205681 A1    Sep. 6, 2007

(51) Int. Cl.
*H02K 49/00* (2006.01)
(52) U.S. Cl. .................. 310/103; 310/105
(58) Field of Classification Search .......... 310/103–108, 310/191, 209
See application file for complete search history.

(56) References Cited

U.S. PATENT DOCUMENTS

| | | | | |
|---|---|---|---|---|
| 2,437,871 A | * | 3/1948 | Wood | 310/103 |
| 2,807,734 A | * | 9/1957 | Lehde | 310/103 |
| 5,514,926 A | * | 5/1996 | Bushman | 310/105 |
| 5,763,973 A | * | 6/1998 | Cramer | 310/103 |
| 6,084,322 A | * | 7/2000 | Rounds | 310/46 |
| 6,411,001 B1 | * | 6/2002 | Henderson et al. | 310/103 |
| 6,762,524 B2 | * | 7/2004 | Six | 310/103 |
| 7,294,947 B2 | * | 11/2007 | Corbin et al. | 310/103 |

\* cited by examiner

*Primary Examiner* — Dang D Le
(74) *Attorney, Agent, or Firm* — Steven J. Miller, Esq.; The Miller Law Offices PLC

(57) ABSTRACT

An apparatus for transferring torque magnetically with a primary rotary member and a secondary rotary member. The primary rotary member has permanent magnets mounted circumferentially on a cylinder, the secondary rotary member having a cylindrical geometry with electroconductive material arranged on its outer periphery and parallel to the axes of the rotary members. The secondary rotary member also having magnetically permeable material. The secondary rotary member is placed partially or totally inside the primary rotating member. The secondary rotary member's axial position relative to the primary rotating member can be varied by a suitable mechanical structure. This causes the two rotary members to axially overlap one another more or less as desired. Rotation of the primary rotary member causes rotation of the secondary rotary member, since magnetic flux lines emanating from the permanent magnets mounted on the primary rotating member, cut through all, or part of, the electroconductive material placed on the periphery of the secondary rotary member. This can vary the torque transmitted between the two rotary members, thereby enabling the varying of the rotational speed of the secondary rotary member relative to the primary rotary member.

2 Claims, 9 Drawing Sheets

APPARATUS FOR TRANSFERRING TORQUE MAGNETICALLY

CROSS REFERENCE TO RELATED APPLICATIONS

This PCT international application claims priority from current pending U.S. patent application Ser. No. 10/790,571 which has a priority filing date of Mar. 1, 2004.

STATEMENT REGARDING U.S. FEDERALLY SPONSORED RESEARCH OR DEVELOPMENT

Not Applicable.

DESCRIPTION OF ATTACHED APPENDIX

Not Applicable.

TECHNICAL FIELD OF THE INVENTION

The present invention relates to rotational magnetic torque transfer devices utilizing two coaxial cylinders overlapping one another wherein one cylinder contains a row(s) of permanent magnets and the other cylinder contains a ring(s) of electroconductive material.

BACKGROUND OF THE INVENTION

It is desirable to devise a permanent magnet excited mechanism for transmitting variable torque in drive applications. Specifically there is a need to couple constant speed devices such as motors or engines to variable output speed and torque devices such as pump impellers, fans, propellers, wheels, etc.

Transmission devices including various eddy current clutches have been in use for some time in various forms. An examination of the prior art shows that these eddy current devices are limited to three general types 1. Current fixed gap permanent magnet disk clutches are limited in their ability to transmit large amounts of torque and are constructed in a manner which causes instability at higher speeds. These limitations relegate the practical application of these devices to low speed, low horsepower application.
2. Eddy current clutches that use DC current to generate and vary the flux density in a fixed gap mechanism. These devices are available in a wide range of horse power but are expensive, complicated and require a DC current and control to induce the torque. There are applications where the DC current is not desirable or where the apparatus for controlling the torque producing currents are unreliable.
3. Current variable gap permanent magnet disk clutches are limited in their ability to transmit large amounts of torque and are constructed in a manner which causes instability at higher speeds. These limitations relegate the practical application of these devices to low speed, low horsepower application.

The apparatus described utilizes recent developments in magnetic material technology, in conjunction with architecture designed for mechanically stable operation. This will allow the apparatus to be used in a full range of power transmission applications including high horsepower applications. The configuration of the device also makes it stable and able to operate at higher input speeds, which are natively present in some motors and engines.

The described apparatus is a device that uses permanent magnets and conductors arranged in an optimal manner to generate the magnetic flux in a power transmission drive. A number of the embodiments described utilize a mechanical means for changing the flux density between two rotating components to vary the torque transmitted by and thereby the output speed of the apparatus.

BRIEF SUMMARY OF THE INVENTION

The present invention utilizes permanent magnets to transmit variable or fixed torque between two rotating elements. In one embodiment, the torque between the elements may be adjusted by mechanically varying the amount of magnetic flux passing between the elements. This is accomplished by varying the extent to which the elements are axially overlapped. In a preferred embodiment of the apparatus, two concentric cylinders, one containing one or more rows of permanent magnets, is moved axially in order to progressively axially overlap a second cylindrical element containing electrically conductive and magnetically conductive elements. This progressive axial overlapping of the two cylinders allows variation in the amount of magnetic flux intersecting the two concentric cylinders. This causes the amount of induced electrical current in the cylinder containing the electro-conductive elements to vary, which then causes the induced counter magnetic forces to vary. The magnetic forces and, thus, torque transmitted will vary based on the amount of axial overlap.

The proposed invention overcomes previous limitations by taking advantage of new technologies in magnet materials and provides a stable means of mechanically varying large amounts of transmitted torque without the need for large external current controls.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

Description of selected embodiments of the invention included herein are listed as follows.

DETAILED DESCRIPTION OF THE INVENTION

Figure 1:
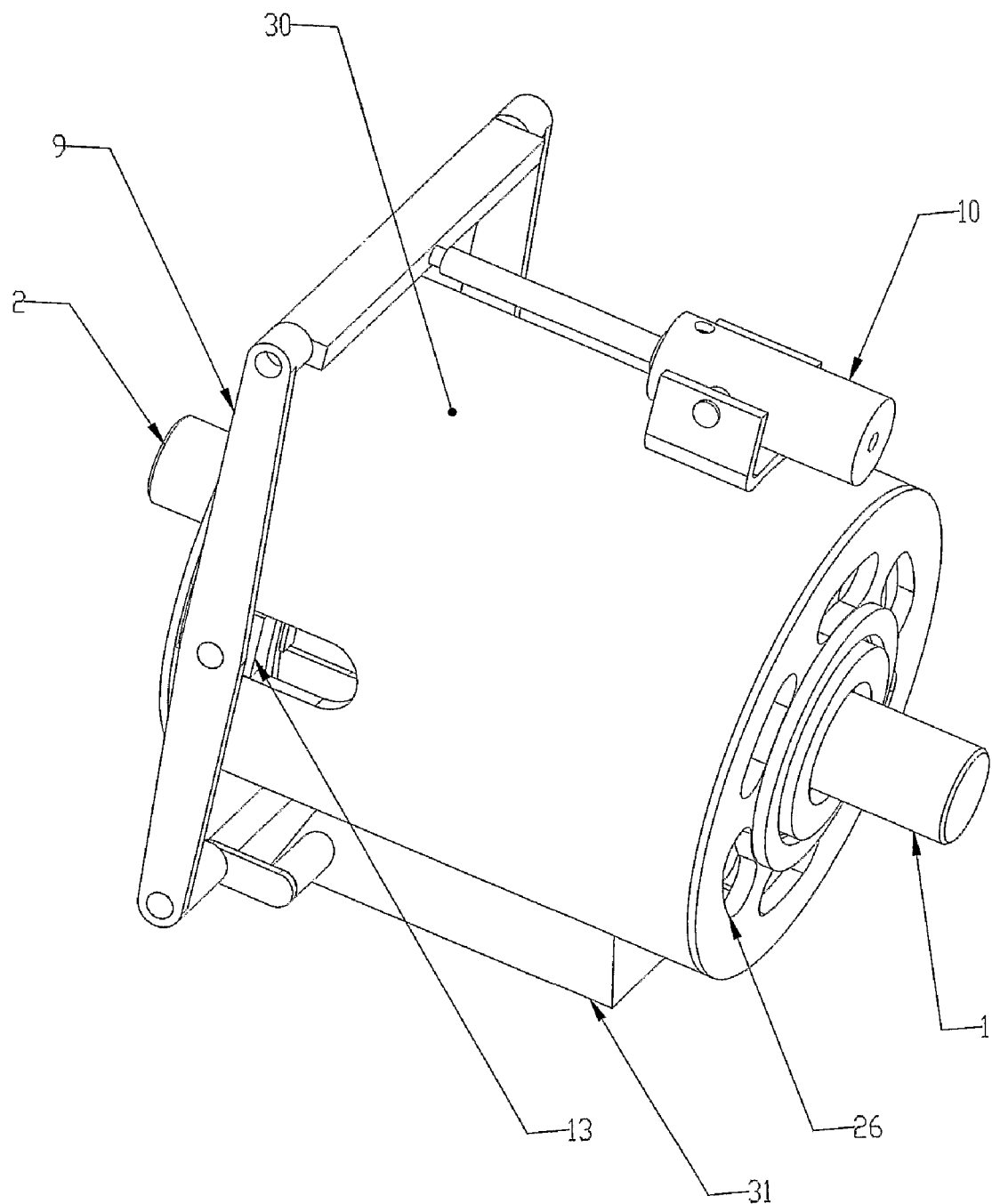
FIG. 1 is an isometric view of the exterior of a preferred embodiment of the invention.

Detailed descriptions of preferred embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Referring to FIGS. 1 through 4, a first embodiment of the invention is shown and described as it applies to a variable speed drive application. The first part of the variable speed torque transfer apparatus described in this preferred embodiment consists of a primary rotary member comprising an input shaft rotor (2), a support cylinder (3), and a magnet-carrying rotor (4), all mechanically connected together, and constrained to rotate at the same angular velocity together. The second part of the variable speed torque transfer apparatus described in this preferred embodiment consists of a secondary rotary member comprising an output shaft rotor (1), magnetically permeable ferrous wheels (7) which support and back the electro-conductive rings (6), all mechanically connected together, and constrained to rotate at the same angular velocity together. The input shaft (2) is connected directly to a concentric support cylinder (3), which is constrained to rotate with the input shaft (2). The support cylinder (3) and input shaft (2) are supported by two input shaft support bearings (12) located at each end of the support cylinder (3). These two bearings (12) are in turn, supported by the apparatus exterior protective enclosure (30), which has mounting feet (31) on its underside section. These mounting feet are then attached to a type of machinery a foundation (not shown). A separate magnet-carrying rotor (4) is mounted concentrically within the support cylinder (3) and is constrained to rotate with the support cylinder (3). The magnet-carrying rotor (4) is also constrained to move axially with respect to the support cylinder (3) while maintaining its rotational and concentric relationship with the support cylinder (3). In the preferred embodiment the constraints are comprised of four pairs of rollers (14) whose axles are radially positioned on the magnetic carrying cylinder and disposed to engage and run in longitudinal slots (15) in the support cylinder (3). It is noted that those skilled in the art could conceive of other means for supporting and constraining the magnet-carrying rotor (4). In this preferred embodiment, the interior surface of the magnet-carrying rotor (4) contains one or more annular arrays, each array consisting of a plurality of magnets (5) which are arrayed radially around the internal periphery of the magnet-carrying rotor (4). The poles of the magnets (5) are geometrically positioned to be radial and are magnetically arranged so that the polarity varies at each successive magnet, i.e. north then south, or alternately, in groups, so that the polarity alternates only after a plurality of magnets of a particular polarity (north or south) are grouped together. The magnetic poles face radially inward around the periphery of the cylinder. In the preferred embodiment described, three such arrays of alternating magnets are included. The invention is not limited by the length of the magnets, quantity of magnets in each annular ring and the number of annular magnetic rings. The support cylinder (3) immediately surrounding and supporting the magnets is made from a magnetically permeable material, preferably iron or steel. The purpose of using magnetically permeable material is to provide a continuous magnetic flux path between the magnetic pole faces, thereby allowing optimum magnetic flux arrangements to exist. Located concentrically inside of the magnet-carrying rotor (4) and not constrained to rotate with the magnet-carrying rotor (4), are electro-conductive rings (6) mounted circumferentially on magnetically permeable ferrous wheels (7), connected to, and constrained to rotate with, an output shaft (1). The electro-conductive rings (6) are separated from the faces of the magnets (5) by a small radial gap, which allows clearance for the primary and secondary rotary members to rotate independently of each other. Each such cylinder consists of an external ring of material with a good electrical conductivity (6), manufactured from a conductive material such as copper or aluminum, and interior support wheels (7) manufactured from a magnetically permeable material such as iron or steel. It is preferable that the magnetically permeable material be constructed from thin laminated pieces of ferrous material, in which the laminated pieces are coated with an electrically insulative material with a high dielectric value. These laminated pieces are stacked together to form the cylindrical support for the electro-conductive material rings (6). It is the purpose of the magnetic material to allow for a complete magnetic path through the electro-conductive layer and back the magnets. The laminations will reduce large scale undesirable eddy currents from being induced in the magnetically permeable material. The electro-conductive rings (6), their support wheels (7), and the output shaft (1) are supported by two output shaft support bearings (11) located at each end of the output shaft (1).

In operation, the poles of the magnets (5) mounted to the magnet-carrying rotor (4) pass over the electro-conductive material, as the magnet-carrying rotor (4) rotates. This action will induce electrical currents in the electro-conductive rings (6) and the induced magnetic forces produced by the currents in these rings (6) will cause magnetic interaction between the rotors, and thereby cause torque to be transmitted between the magnet ring (5) and the rings (6), their support wheels (7), and attached output shaft (1). The torque will vary based on the relative rotational speed of primary rotary member and the secondary rotary member, and the amount of axial overlap between the magnet rings (5) and the electro-conductive rings (6). As one experienced in the art will realize, the number of annular arrays of magnets (5) with corresponding wheels of electro-conductive rings (6) used, can vary from one to a plurality, and the invention is not limited by the number of these rings selected or utilized.

The magnetic-carrying rotor (4) being movable axially within the support cylinder (3), allows for the amount of axial overlap of the rings of magnets (5) to the electro-conductive rings (6) to be adjustable by means of this variable axial motion. With magnet-carrying rotor (4) positioned so that the annular rings of magnets (5) are fully staggered or offset between the electro-conductive material rings (6), so that very small amount of axial overlap exists, a minor amount of magnetic flux is transmitted between the magnet-carrying rotor (4) and the electrico-conductive rings (6), and therefore a very small amount of torque is transmitted between the primary rotary member and the secondary rotary member. As the magnetic-carrying rotor (4) moves axially within its support cylinder (3), the amount of axial overlap between the magnetic rings (5) and the electro-conductive rings (6) increases. As the amount of axial overlap increases, the amount of magnetic flux intersecting the electro-conductive rings (6) increases. This causes the amount of electrical current induced in the electro-conductive rings (6) to increase, which thereby causes more torque to be transmitted, until at full overlap axial position, maximum transmitted torque is achieved.

In the preferred embodiment described, control of the axial position of the magnetic-carrying rotor (4) relative to the electro-conductive rings (6), is provided by motion transmitted from an exterior linkage (9) which positions a trunnion and ring (13) carrying the outer race of a thrust transmitting bearing (8). The inner race of the thrust bearing (8) is attached directly to the magnet-carrying rotor (4). The inner race of the thrust bearing (8) is supported at protruding attachment locations (29) which extend radially outward through slots (21) in support cylinder (3). The mechanism described will position the magnet-carrying rotor (4) by virtue of motion of the exterior linkage. An individual skilled in the art will realize that a number of alternate means internal and external are also available for the positioning of the magnet-carrying rotor (4). A means is provided for moving and positioning the magnet-carrying rotor (4) via the mechanism (9). In the described embodiment, the means shown is a hydraulic cylinder (10), but the invention is not restricted to this means solely. Other means may be used to move the magnet-carrying rotor (4) axially. Other means include, but are not limited to, manual actuation by a mechanical lever, electro-mechanical self-synchronous devices, or an actuator with a drive screw arrangement. Other applicable means of adjustment would be selected largely depending on the intended application of the apparatus.

Figure 2:
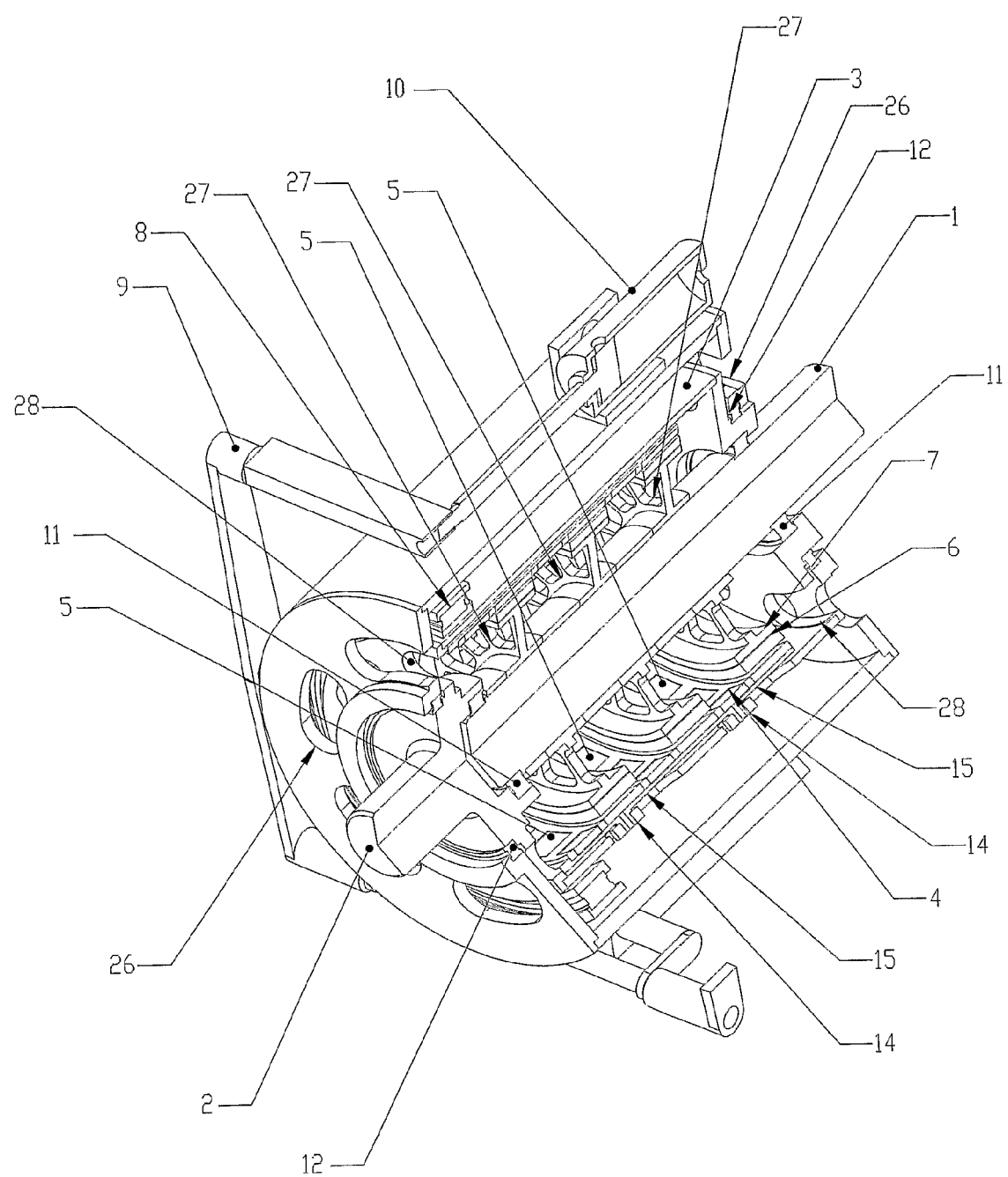
FIG. 2 is a sectioned isometric view of the preferred embodiment of the invention.
Figure 3:
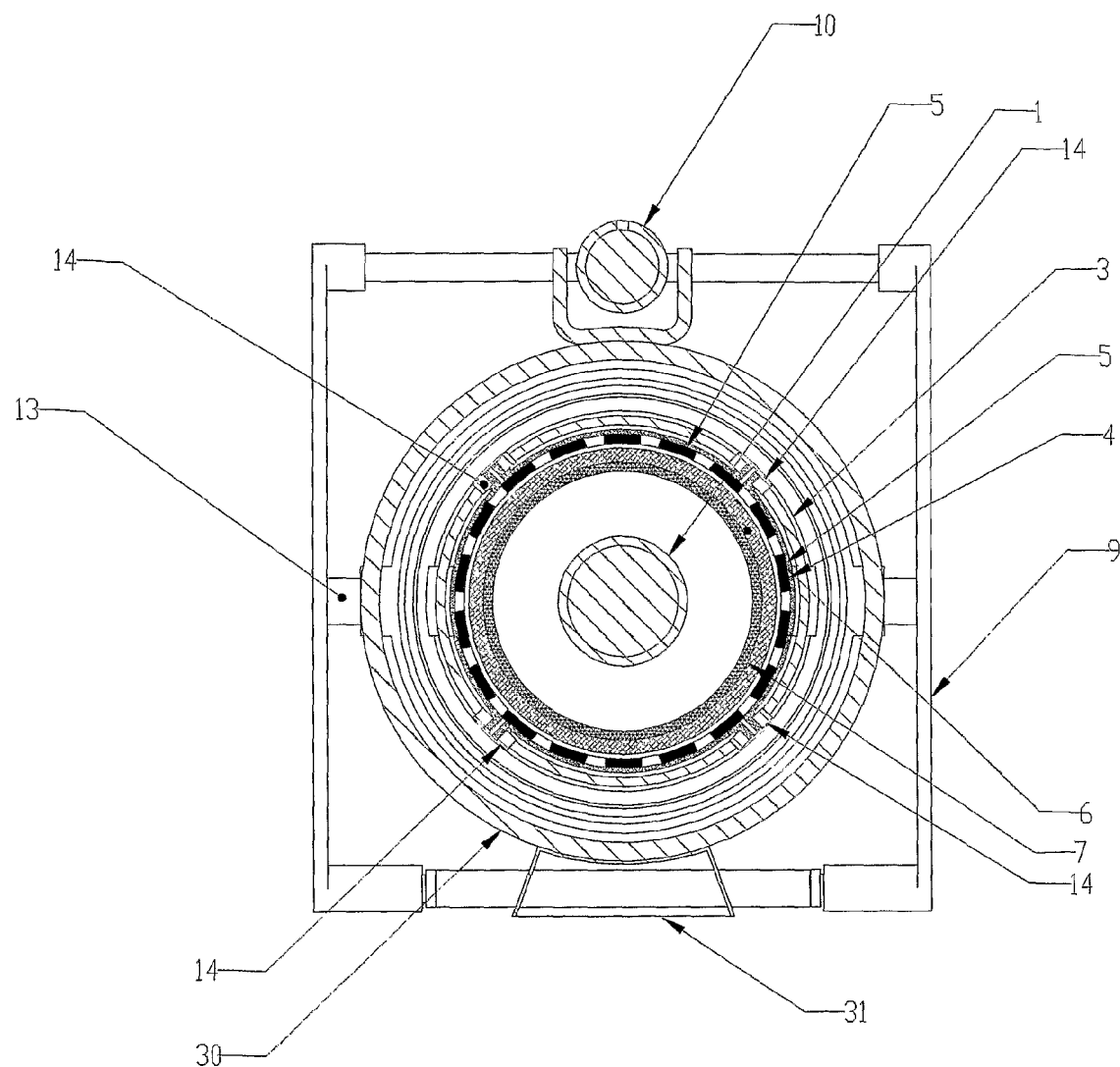
FIG. 3 is section view through the preferred embodiment of the invention.
Figure 4:
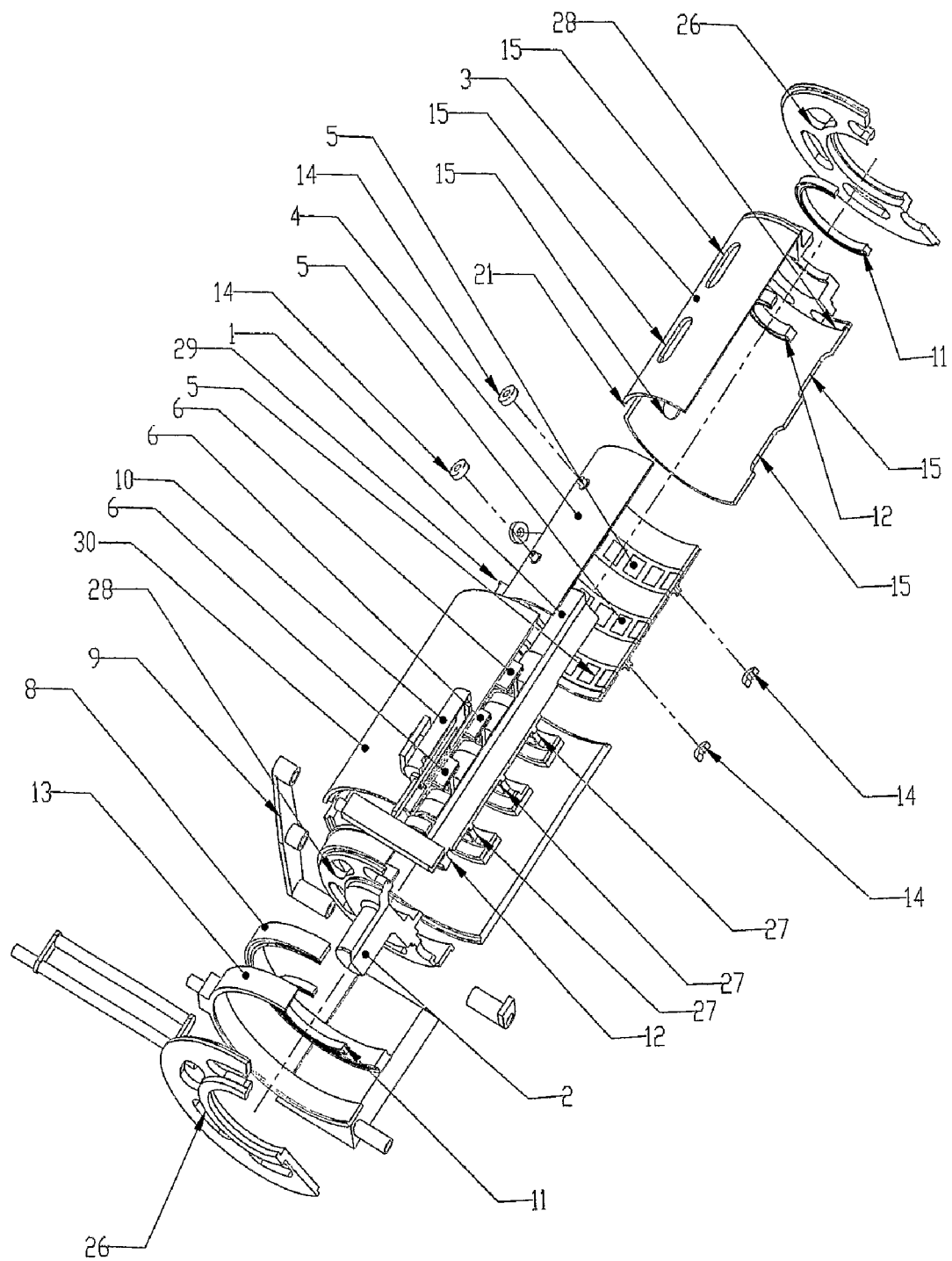
FIG. 4 is an exploded section view showing the various major parts of the described preferred embodiment of the invention.

In the embodiment as depicted in FIGS. 2 and 4, open slots are included through the apparatus end caps (26), the wheels (7), and the end caps (28) of the support cylinder (3). These slots allow for the passage of cooling air through the apparatus. It is recognized that heat will be generated as a result of the electrical currents generated in the rotors of the apparatus. As such, means may be provided for the removal of excessive heat. These means can include ventilation as shown in the embodiment of FIGS. 2 and 4, forced air convective heat transfer (not shown), sealed direct refrigerant cooling (not shown), or forced liquid cooling (not shown).

Figure 5:
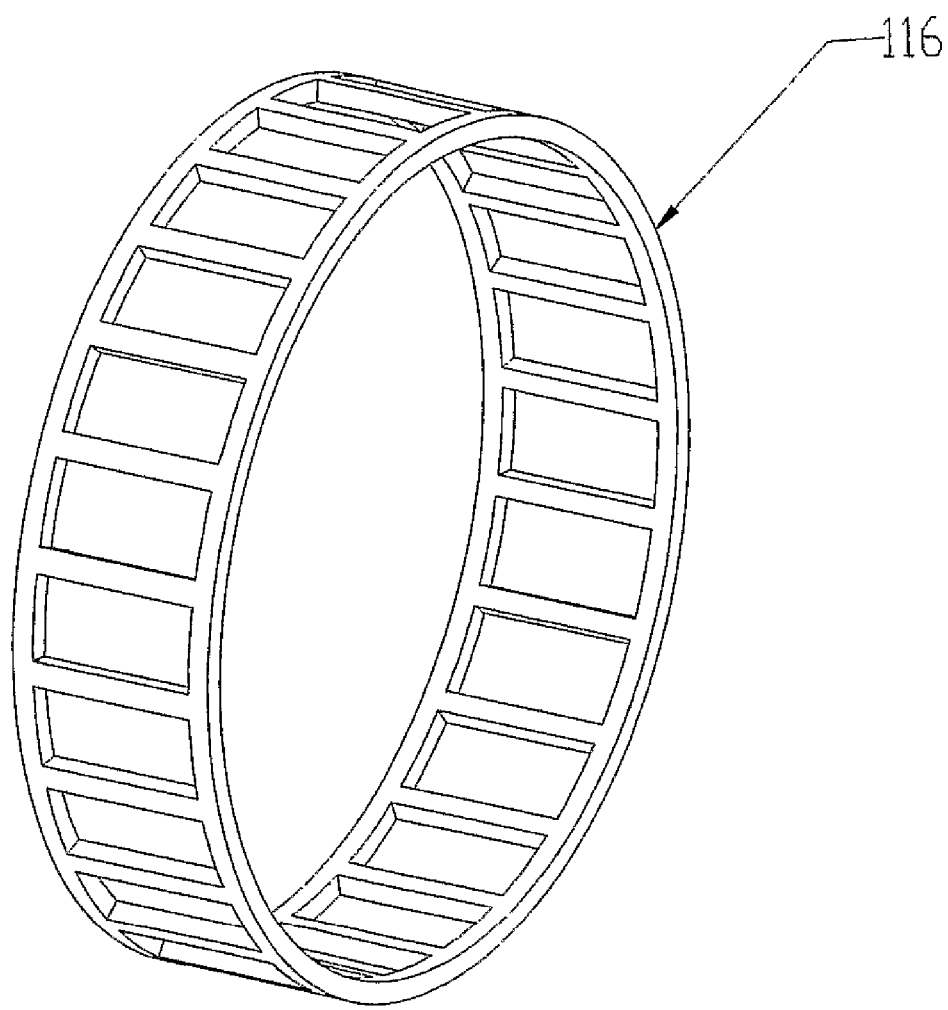
FIG. 5 is a section view of an alternate form of electrically conductive cylinder as described in the alternate embodiment of the invention.
Figure 6:
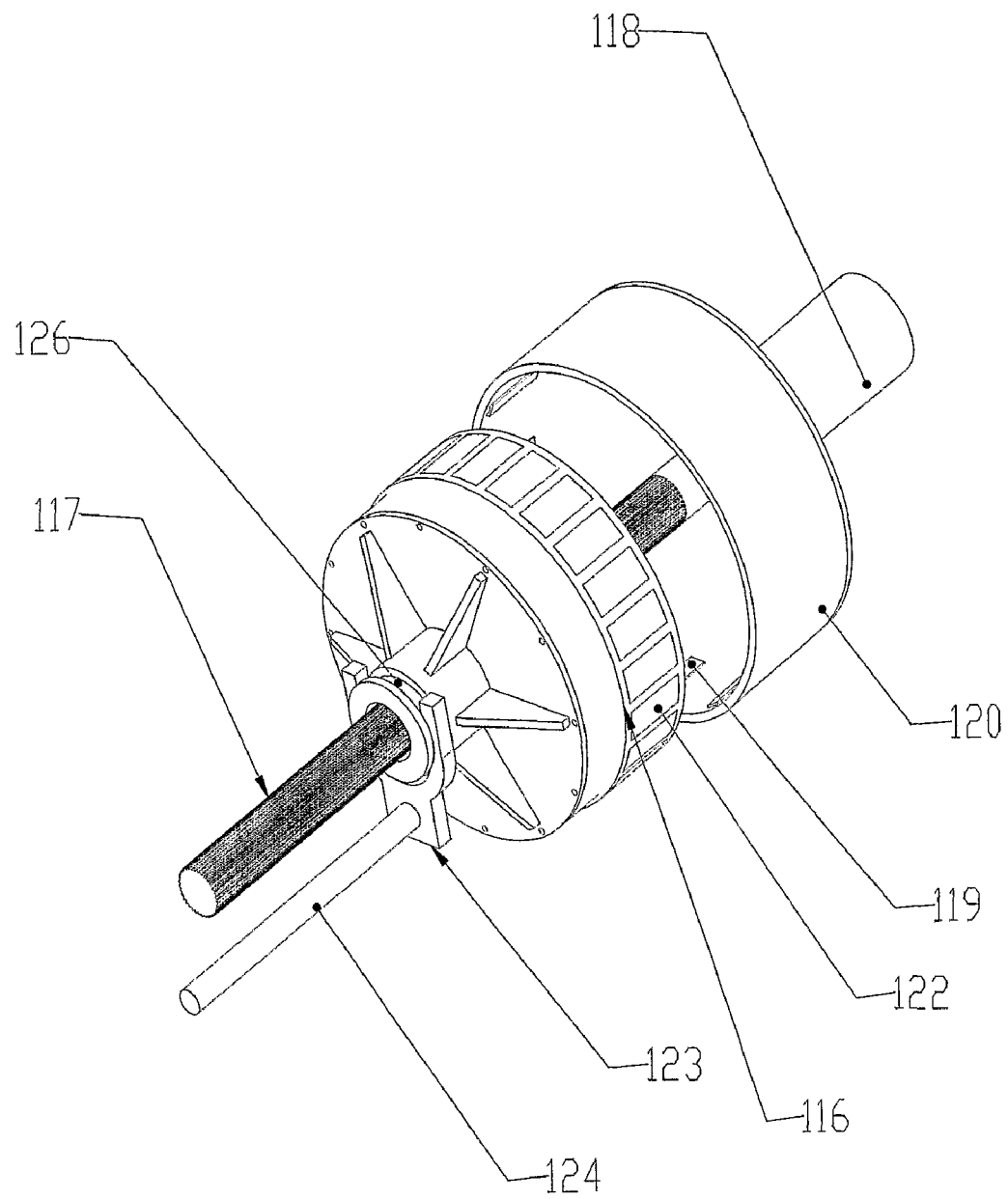
FIG. 6 is an isometric of an alternate embodiment of the invention.
Figure 7:
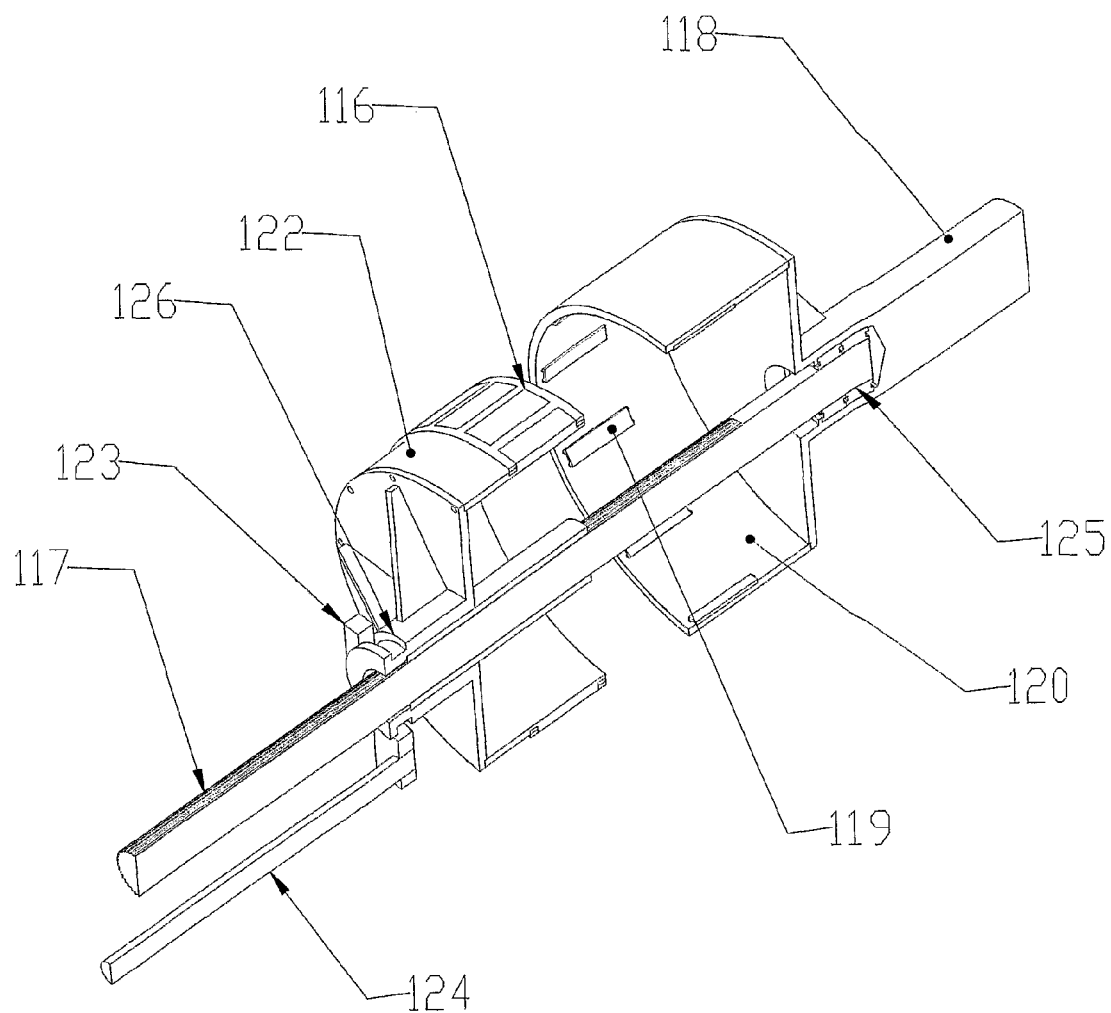
FIG. 7 is a cut away through the isometric of the alternate embodiment of the invention.

An alternative embodiment is depicted in FIGS. 5, 6 and 7. The first part of the variable speed torque transfer apparatus described in this alternative embodiment consists of a primary rotary member comprising an input shaft rotor (118) and a magnet-carrying rotor (120), mechanically connected together, and constrained to rotate at the same angular velocity together. The second part of the variable speed torque transfer apparatus described in this alternative embodiment consists of a secondary rotary member comprising an output shaft rotor (117), magnetically permeable ferrous cylinder (122), which supports and backs an electro-conductive ring (116), all mechanically connected together, and constrained to rotate at the same angular velocity. In this embodiment, a magnet-carrying rotor (120) is attached directly to the input shaft (118). The array of magnets (119) rotate with the magnet-carrying rotor (120) and are constrained by the rotor to move concentrically about the center of rotation of the shaft (118) and to move synchronously with the shaft (118). As in the previous embodiment, the poles of the magnets (119) are geometrically positioned to be radial and are magnetically arranged so that the polarity varies at each successive magnet, i.e. north then south, or alternately, in groups, so that the polarity alternates only after a plurality of magnets of a particular polarity (north or south) are grouped together. The poles point radially inward toward the axis of rotation. An output shaft (117) is constrained to rotate coaxially with the input shaft (118) by bearings (125). A rotor cylinder (122) is mounted on the output shaft (117) and is constrained to rotate synchronously with the output shaft (117) by means of a male spline machined into the output shaft (117). A mating female spline on the rotor cylinder (122) constrains the cylinder to rotate in unison with the output shaft (117) and allows the magnet-carrying rotor (120) to move axially along the output shaft (117). The axial overlap between the ring of magnets (119) and the electro-conductive cylinder (116) of the rotor can be varied by this means. The inner cylinder (122) supports and backs an electro-conductive cylinder (116). In the embodiment described, the electrico-conductive cylinder (116) is in the alternate form of a circumferential ladder type of arrangement with conductive bars joined to conductive end rings. This type of geometry is useful in shaping the direction of the electrical current flow generated by the passing proximity of a magnetic field of the magnet-carrying rotor (120). The electro-conductive ring (116) may also have the geometric form of a smooth solid cylindrical ring. Either embodiment, the smooth cylindrical ring, or the circumferential ladder arrangement, or variations of either, can be used depending on the specified properties of the application. The invention is not limited by the choice of this geometric form. As with the first embodiment, the magnet-carrying rotor (120) is made up of magnetically permeable material to lower the reluctance of the magnetic circuit. The cylindrical rotor (122) supporting the electro-conductive cylinder (116), is fabricated with magnetically permeable material, which completes the magnetic field circuit extending from the rotating magnet ring (119) through the electro-conductive ring (116). As with the first embodiment, it is preferable to construct the magnetically permeable rotor cylinder (122) from thin pieces of electrically insulated ferrous material to reduce undesirable eddy currents in the material. In this embodiment, the rotor cylinder's (122) magnetically permeable material extends up through the openings in the electro-conductive ring (116). This reduces the radial gap between the magnet ring (119) and the electro-conductive ring (116), and thereby increases the magnetic flux while allowing the induced current in the electro-conductive cylinder (116) to surround the magnetically permeable material. This geometry is ideal for producing strong induced electromagnetic fields in the rotors, thereby maximizing the transmitted torque.

A single row of magnets (119) and a single electro-conductive ring (116) are shown in this second embodiment. One skilled in the art would recognize that, additional rows of magnets (119) with corresponding electro-conductive cylinder rings (116), could be utilized. A yoke (123) is positioned in a groove (126) in the flange of the output rotor support cylinder. The yoke allows axial positioning of the rotor (122), thereby changing the amount of axial overlap with the magnetic ring (119) of the magnet-support rotor (120). The amount of magnetic flux transmitted and thus torque transferred, is dependent of the amount of axial overlap of the two rotors. A means is provided for positioning the yoke and rotor cylinder. In this embodiment, axial thrust to actuate and move the electro-conductive ring rotor (116) axially, is provided mechanically through the rod (124). The means to axially move this rod (124) are not shown in this alternate embodiment, but one skilled in the art would recognize the various options for axially moving the electro-conductive ring (116) rotor relative to the magnet-carrying rotor (120), as described in the first embodiment.

One skilled in the art will also recognize that other arrangements of the elements described in the embodiments above are also covered in another embodiment (not shown), the function of the input shaft rotor and output shaft rotors can be functionally exchanged, and the operation of the invention will still work properly.

In another embodiment (not shown), the rings of magnets are mounted in the inner cylindrical rotor with the electro-conductive ring on the exterior cylinder. In these cases, the apparatus would still function as described. As in the first embodiment, the invention is not limited by the number of arrays of magnet rings (119) with corresponding electroconductive rings (116), nor is the invention limited by the means chosen to axially move or actuate these two rings relative to one another.

Figure 8:
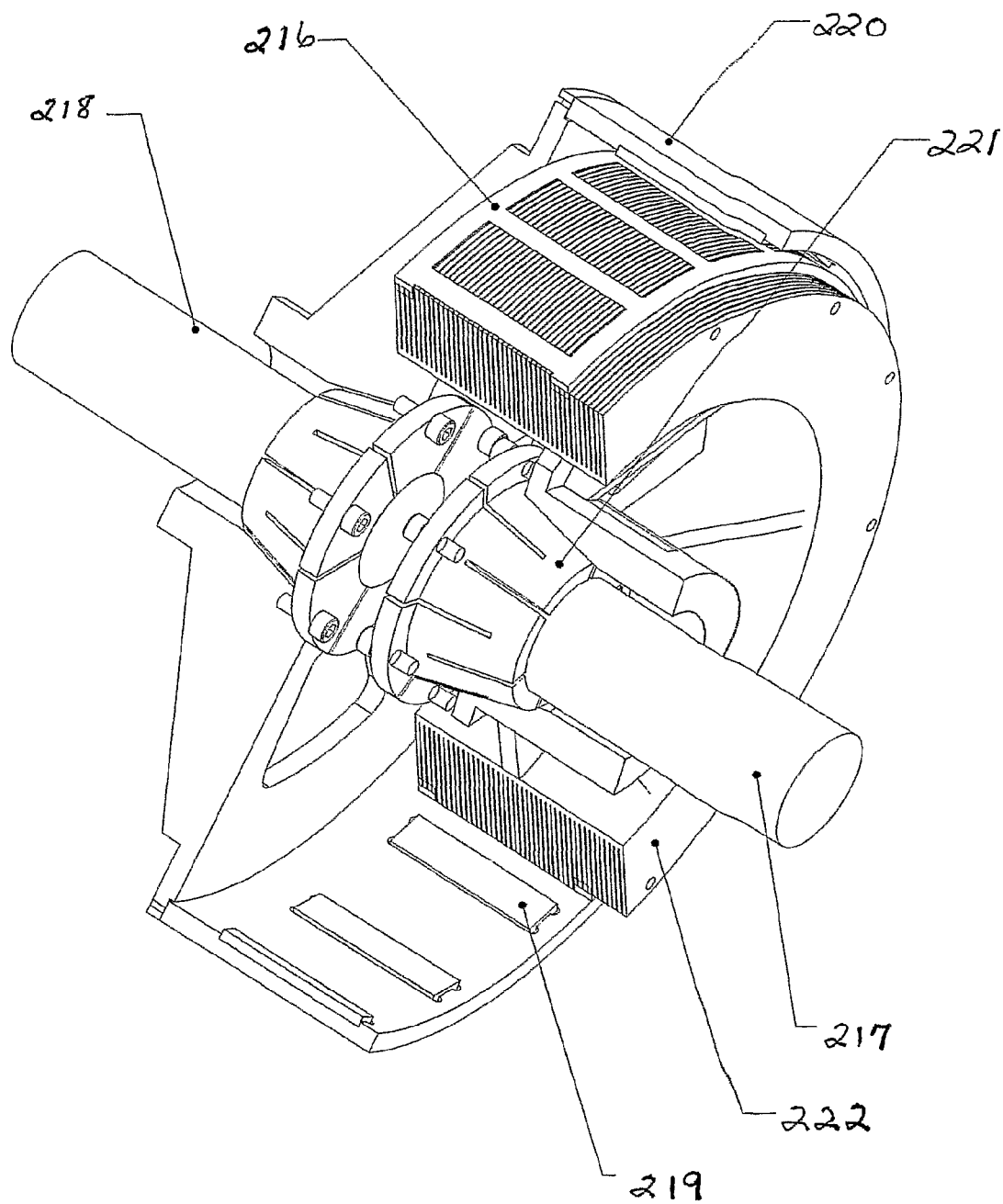
FIG. 8 is an isometric of a second alternate embodiment of the invention.
Figure 9:
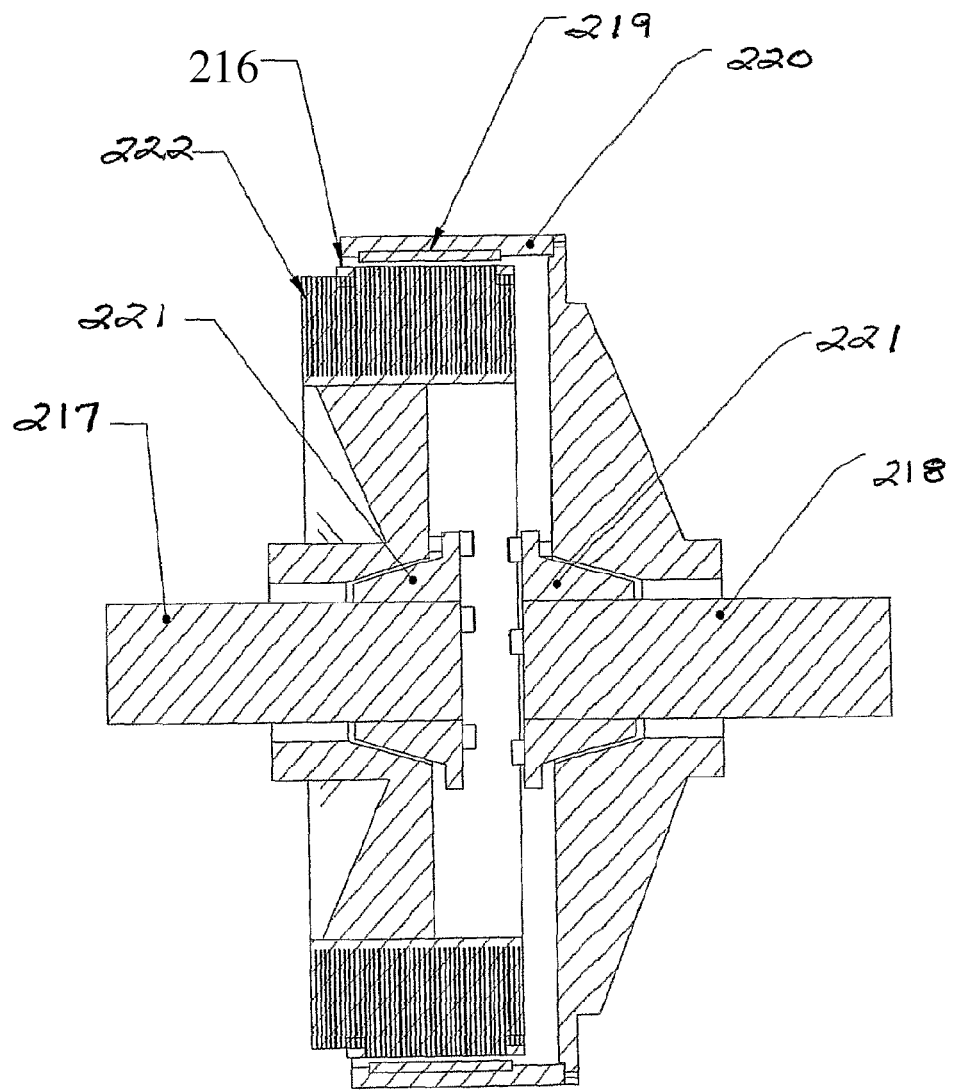
FIG. 9 is a cut away through the isometric of the second alternate embodiment of the invention.

A second alternative embodiment, or third embodiment, is depicted in FIGS. 8 and 9. In this second alternative embodiment, the relative axial position of the two co-axial cylinders remains fixed at what ever axial position the end user desires. This is a mechanically simpler embodiment than the previously described embodiments, and is used in services that do not require the output rotating shaft's angular velocity to vary appreciably from the input rotating shaft's angular velocity while operating. Yet, all the other advantages of the preferred embodiment remain; i.e., relaxed alignment requirements, less shaft-to-shaft vibration transmission, etc. The first part of this torque transfer apparatus described in this second alternative embodiment consists of a primary rotary member comprising an input shaft rotor (218) and a magnet-carrying rotor (220), mechanically connected together, and constrained to rotate at the same angular velocity together. The second part of this torque transfer apparatus described in this second alternative embodiment consists of a secondary rotary member comprising an output shaft rotor (217), magnetically permeable ferrous cylinder (222), which supports and backs an electro-conductive ring (216), all mechanically connected together, and constrained to rotate at the same angular velocity. In this embodiment, a magnet-carrying rotor (220) is attached directly to the input shaft (218). The array of magnets (219) rotate with the magnet-carrying rotor (220) and are constrained by the rotor to move concentrically about the center of rotation of the shaft (218) and to move synchronously with the shaft (218). As in the previous embodiments, the poles of the magnets (219) are geometrically positioned to be radial and are magnetically arranged so that the polarity varies at each successive magnet, i.e. north then south, or alternately, in groups, so that the polarity alternates only after a plurality of magnets of a particular polarity (north or south) are grouped together. The poles point radially inward toward the axis of rotation. An output shaft (217) is constrained to rotate coaxially with the input shaft (218) by bearings (not shown). A rotor cylinder (222) is mounted on the output shaft (217) and is constrained to rotate synchronously with the output shaft (217) by means of a collet type conical collar (221) placed onto the output shaft (217). Similar mechanical means (221) are used for mounting the magnet-carrying rotor (220) onto the input shaft (218). Other mechanical means may be used for mounting the rotor cylinder (222) to the output shaft (217). The inner cylinder (222) supports and backs an electro-conductive cylinder (216). In this second alternate embodiment described, the electro-conductive cylinder (216) is in the alternate form of a circumferential ladder type of arrangement with conductive bars joined to conductive end rings. This type of geometry is useful in shaping the direction of the electrical current flow generated by the passing proximity of a magnetic field of the magnet-carrying rotor (220). The electro-conductive ring (216) may also have the geometric form of a smooth solid cylindrical ring. Either embodiment, the smooth cylindrical ring, or the circumferential ladder arrangement, or variations of either, can be used depending on the specified properties of the application. The invention is not limited by the choice of this geometric form. As with the first two embodiments, the magnet-carrying rotor (220) is made up of magnetically permeable material to lower the reluctance of the magnetic circuit. The cylindrical rotor (222) supporting the electro-conductive cylinder (216), is fabricated with magnetically permeable material, which completes the magnetic field circuit extending from the rotating magnet ring (219) through the electro-conductive ring (216). As with the first two embodiments, it is preferable to construct the magnetically permeable rotor cylinder (222) from thin pieces of electrically insulated ferrous material to reduce undesirable eddy currents in the material. In this embodiment, the rotor cylinder's (222) magnetically permeable material extends up through the openings in the electro-conductive ring (216). This reduces the radial gap between the magnet ring (219) and the electro-conductive ring (216), and thereby increases the magnetic flux while allowing the induced current in the electro-conductive cylinder (216) to surround the magnetically permeable material. This geometry is ideal for producing strong induced electromagnetic fields in the rotors, thereby maximizing the transmitted torque.

A single row of magnets (219) and a single electro-conductive ring (216) are shown in this second alternate embodiment. One skilled in the art would recognize that, additional rows of magnets (219) with corresponding electro-conductive cylinder rings (216), could be utilized.

One skilled in the art will also recognize that other arrangements of the elements described in the embodiments above are also covered in another embodiment (not shown), the function of the input shaft rotor and output shaft rotors can be functionally exchanged, and the operation of the invention will still work properly.

In another embodiment (not shown), the rings of magnets are mounted in the inner cylindrical rotor with the electro-conductive ring on the exterior cylinder. In these cases, the apparatus would still function as described. As in the first two embodiments described herein, the invention is not limited by the number of arrays of magnet rings (219) with corresponding electro-conductive rings (216).

While the invention has been described in connection with a preferred embodiment plus two alternative embodiments, it is not intended to limit the scope of the invention to the particular forms set forth, but on the contrary, it is intended to cover such alternatives, modifications, and equivalents as may be included within the spirit and scope of the invention as defined by the appended claims.

What is claimed is:

1. An apparatus for transferring torque magnetically comprising: a primary torque driving rotary member and a secondary driven rotary member; the primary rotary member axially overlapping said secondary rotary member; the secondary rotary member being surrounded by said primary member; the primary rotary member having permanent magnets mounted on it; the secondary rotary member having electroconductive elements and magnetically permeable materials neither of which are ferromagnetic, and not having permanent magnets; said secondary rotary member axially overlapped by said primary rotating member wherein said primary rotary member's axial position relative to said secondary rotating member is fixed; and said primary rotating member being connected to and driven by a torque producing device and said secondary rotating member being connected to a torque utilizing device whereby rotation of the primary rotary member causes rotation of said secondary rotating member by some or all of the magnetic flux lines emanating from said permanent magnets mounted on said primary rotating member cutting through the electroconductive material on said secondary rotary member thereby generating torque and rotation in said secondary rotary member in relation to the percentage of the total area that said secondary rotary member is axially overlapped by said primary rotary member.

2. An apparatus for transferring torque magnetically comprising: a primary torque driving rotary member and a secondary driven rotary member; the primary rotary member axially overlapping said secondary rotary member; the secondary rotary member being surrounded by said primary member; the primary rotary member having electroconductive elements and magnetically permeable materials neither of which are ferromagnetic, and not having permanent magnets; the secondary rotary member having permanent magnets mounted on it; said secondary rotary member axially overlapped by said primary rotating member wherein said primary rotary member's axial position relative to said secondary rotating member is fixed; and said primary rotating member being connected to and driven by a torque producing device and said secondary rotating member being connected to a torque utilizing device whereby rotation of the primary rotary member causes rotation of said secondary rotating member by some or all of the magnetic flux lines emanating from said permanent magnets mounted on said primary rotating member cutting through the electroconductive material on said secondary rotary member thereby generating torque and rotation in said secondary rotary member in relation to the percentage of the total area that said secondary rotary member is axially overlapped by said primary rotary member.

* * * * *